United States Patent Office 2,747,738
Patented May 29, 1956

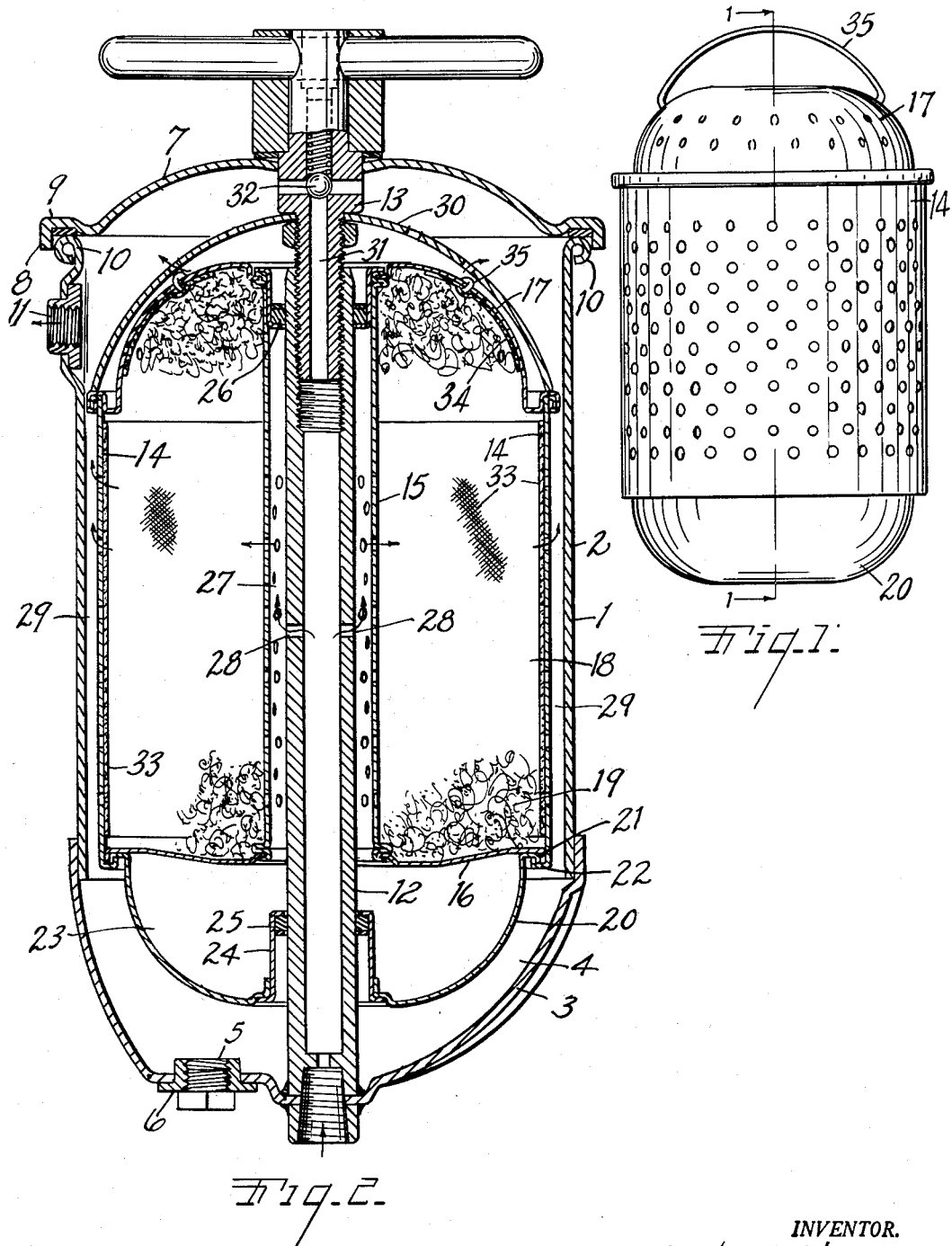

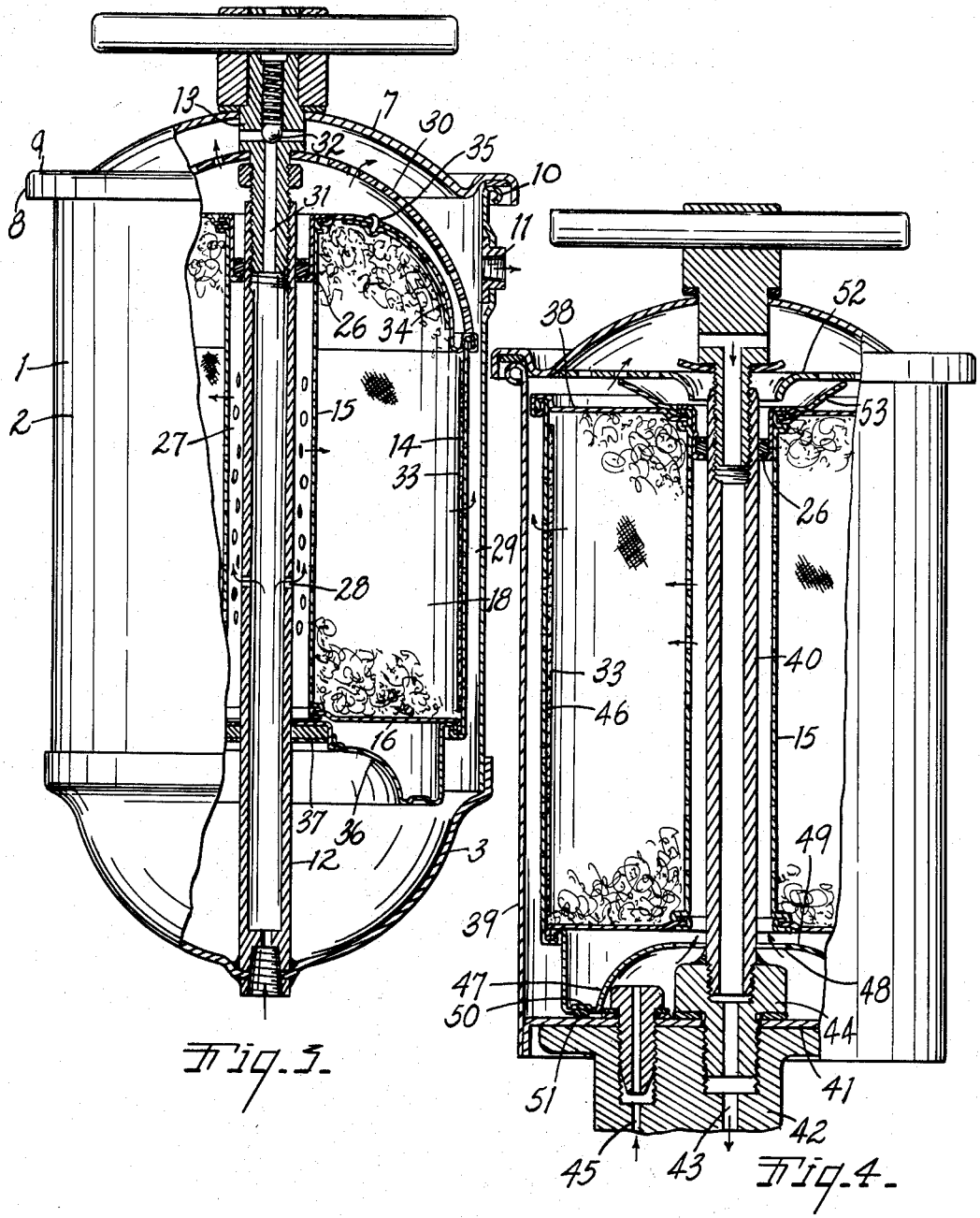

2,747,738
OIL FILTER

Stephen I. Johnson and James W. Wilkinson, Hastings, Mich., assignors to Hastings Manufacturing Company, Hastings, Mich., a corporation of Michigan Application April 24, 1953, Serial No. 350,789

12 Claims. (Cl. 210—140)

This invention relates to improvements in an oil filter. The main objects of this invention are:

First, to provide an oil filter for internal combustion engines which includes a removable replaceable cartridge having a sump integral therewith for the collection of heavy solids and water.

Second, to provide a filter having these advantages in which the cartridge is easily inserted and removed from the container and at the same time effective seals are automatically provided.

Third, to provide a removable filter cartridge in which the walls are entirely of metal, maintain their shape and are supported so as not to become bonded to the container by use.

Fourth, to provide a filter cartridge having a sump constituting a part of the assembled cartridge unit.

Objects relating to details and economies of the invention will appear from the description to follow. The invention is defined and pointed out in the claims.

A preferred embodiment of the invention is illustrated in the accompanying drawings, in which:

Fig. 1 is a side elevational view of the filter cartridge of our invention removed from the container and with the bail or handle in raised position for handling the cartridge.

Fig. 2 is a vertical section through a complete filter embodying our invention with the filter cartridge in assembled relation to a container, the means for mounting the container on an internal combustion engine or the like not being illustrated.

Fig. 3 is a side elevational view of a modified form embodying our invention partially in vertical section.

Fig. 4 is a side elevational view partially in vertical section illustrating another embodiment or modification of our invention.

It has been our observation that filters for the lubricating oil in the internal combustion engine crankcase are frequently neglected in that filter cartridges are not renewed as frequently as should be. This we believe is the result of the difficulty commonly experienced in withdrawing a used cartridge from the container and cleaning the container, both of which operations are likely to be difficult to perform. Further, the efficiency and life of the filter cartridge is relatively short, owing to the fact that everything contained in the circulating lubricant must pass through the filter resulting in the clogging of the filter with solids and decreasing its efficiency. One of the main aims of our invention is to provide a structure in which the filter may be quickly and easily removed for replacement, the container cleaned and a new cartridge inserted in the container. The cartridge and the associated part are provided with sealing means which are rendered effective merely by the insertion of the cartridge into the container.

In the embodiments of our invention shown in Figs. 1 and 2, the container designated generally by the numeral 1 comprises a cylindrical side wall 2, a generally spherically curved bottom 3 fixedly connected to the side wall and constituting a sump chamber 4. The sump is provided with a drain opening 5 normally closed by the plug 6. The cover 7 has a downturned flange 8 embracing the top of the side wall and provided with a gasket 9 seated on the beaded end 10 of the container.

The container is provided with a discharge opening 11 internally threaded to receive a conduit, not illustrated. The oil inlet pipe 12 is fixedly mounted on the bottom 3 of the container to project centrally therein. The cover attaching bolt 13 is threaded into the upper end of the pipe 12.

The filter cartridge of our invention comprises foraminate cylindrical outer and inner walls 14 and 15 connected in spaced relation by the bottom wall 16 and top wall 17. The foraminate top wall in the embodiment of Figs. 1 and 2 is dome-shaped while the bottom wall is imperforate. These top and bottom walls are seamed to the ends of the outer and inner walls and coact therewith to provide a chamber 18 for fibrous filtering material 19.

A sump wall 20 is connected to the filter walls to form an integral unit therewith, the sump wall having a seam flange 21 engaged in the seam 22 for the bottom wall 16 to the outer cartridge wall 14. The sump wall 20 coacts with the bottom cartridge wall to provide a sump chamber 23. The tubular extension 24 on the sump bottom wall is provided with a gasket or packing ring 25 which slidably embraces the pipe 12. A gasket or packing ring 26 is disposed within the inner cartridge wall 15 and fixedly connected thereto to slidably receive the pipe 12.

The sump chamber 23 opens into the space 27 between the inner wall and the pipe 12, this space constituting a passage for the oil from the discharge openings 28 in the inlet pipe 12. The outer wall of the cartridge is spaced from the wall of the container to provide an annular space 29 for the flow of filtered lubricant from the filter cartridge to the discharge opening 11. To position the cartridge within the container, the domed positioning member 30 is provided, this being mounted on the cover attaching bolt.

In the embodiment shown in Figs. 1 and 2, the top 17 of the filter cartridge is foraminated and outlet holes are provided in the holder or positioning member 30. To permit circulation of lubricant in the event of the filter becoming clogged, the bolt 13 is provided with a vent or pressure relief passage 31 opening to the container and provided with a spring seated relief valve 32. Ordinarily this valve is closed but should the pressure in the lubricating system become excessive, the valve 32 opens.

With the parts thus arranged, the solids are collected in the sump and are not carried into the filtering material to clog the same. When the filter does become inefficient, it may be easily removed and inasmuch as the walls are of metal they cannot contact or become bonded to the container wall which frequently occurs where the walls are of fabric. The outer cartridge wall 14 is desirably provided with a liner 33 of fabric and the top wall 17 with a similar lining 34.

In the embodiment illustrated, a handle 35 is provided, this handle collapsing onto the top wall as is indicated in Fig. 2. The drain 5 may be opened occasionally to drain out heavy or undesirably viscous oil which may collect therein.

In the embodiment shown in Fig. 3, the parts are the same as described with the exception as to the shape of the sump wall 36 which has an upwardly offset central portion on which the gasket 37 is mounted. This modification is primarily designed to accommodate containers of a different type or design from that shown in Fig. 2.

In the embodiment of our invention shown in Fig. 4, the top wall 38 of the cartridge is flat and imperforate.

In this embodiment the container 39 is provided with an upstanding outlet pipe 40 opening at its upper end to the container.

The bottom 41 of the container has an adapter 42 secured to the under side thereof and provided with a discharge 43 for the outlet pipe 40 which is secured to the adapter by the fixture 44. The adapter 42 has an inlet passage 45 opening to the bottom of the container.

The cartridge, designated generally by the numeral 46, is the same as in the embodiments of Figs. 1 to 3, inclusive, except for the flat top wall, as described, while the sump wall 47 has a central opening 48 in its dome-shaped raised central portion 49, this opening permitting the flow of incoming oil to the bottom of the passage within the inner wall of the cartridge. In this embodiment the bottom wall of the sump is provided with an annular seat 50 for the gasket 51 to seal the incoming oil or lubricant from the space in the container surrounding the cartridge. The cartridge at its upper end is provided with a sealing gasket or packing 26, the same as in the other embodiments. In this embodiment, the positioning plate 52 is flat and engages the flaring collar 53 at the upper end of the cartridge.

In all of the embodiments of our invention, the cartridge may be quickly inserted or removed and lubricant tight joints or seals are provided. The incoming lubricant in all three of the embodiments flows freely in the inlet passage defined by the inner wall of the cartridge so that the lubricant is well distributed for passage through the filtering material, which is desirably cotton flock uniformly compacted, and completely filling the cartridge. The cartridge is cylindrical and the inner and outer walls concentric so that the filtering media is of uniform thickness.

In the embodiments shown in Figs. 1 to 3, some lubricant may pass through the foraminate top wall although the main filtering flow is radial.

We have illustrated and described our invention in commercially practical embodiments thereof and it is found that the ease with which the cartridge may be removed and replaced is an inducement to give proper attention and care to the filters. We have not attempted to illustrate or describe other embodiments or adaptations as it is believed that ths disclosure will enable those skilled in the art to embody or adapt our invention as may be desired.

Having thus described our invention, what we claim as new and desire to secure by Letters Patent is:

1. In an oil filter, the combination of a cylindrical container open at the top and provided with a removable cover and having a closed bottom constituting a sump and provided with a drain opening, a centrally disposed inlet pipe mounted on the bottom of the container to extend upwardly therefrom centrally of the container and internally threaded at its upper end, a removable filter cartridge comprising concentric outer and inner foraminate walls, a closed bottom wall and a foraminate domed top wall, said bottom and top walls connecting said outer and inner cartridge walls in spaced relation and coacting therewith to define a chamber filled with fibrous filtering material, the inner cartridge wall spacedly surrounding said inlet pipe, the outer cartridge wall being spaced from the container wall which is provided with an outlet, the inlet pipe having discharge openings communicating with the space within the inner cartridge wall, an imperforate sump wall peripherally connected to the bottom of the outer cartridge wall below the said cartridge bottom wall and constituting a sump chamber opening to the space between said inner cartridge wall and said inlet pipe, said sump wall having an opening for said inlet pipe provided with a gasket slidably and supportedly engaging said inlet pipe, said inner cartridge wall being provided with a gasket slidably and supportedly engaging said inlet pipe adjacent the upper end thereof and above its discharge openings, a cover attaching bolt disposed through said cover and threaded into said inlet pipe and having a longitudinal pressure relief passage therein opening to said inlet pipe and within the container above the cartridge, said relief passage being provided with a pressure relief valve, and a domed foraminate cartridge positioning member carried by said bolt and spacedly embracing the top wall of the cartridge.

2. In an oil filter, the combination of a container, a centrally disposed inlet pipe extending upwardly from the bottom of the container, a removable filter cartridge comprising concentric outer and inner foraminate walls, a closed bottom wall and a foraminate top wall, said bottom and top walls connecting said outer and inner cartridge walls in spaced relation and coacting therewith to define a chamber filled with fibrous filtering material, the inner cartridge wall spacedly surrounding said inlet pipe, the outer cartridge wall being spaced from the container wall which is provided with an outlet, the inlet pipe having discharge openings communicating with the space within the inner cartridge wall, and an imperforate sump wall peripherally connected to the bottom of the outer cartridge wall below the said cartridge bottom wall and constituting a sump chamber opening to the space between said inner cartridge wall and said inlet pipe, said sump wall having an opening for said inlet pipe provided with a gasket slidably and supportedly engaging said inlet pipe, said inner cartridge wall being provided with a gasket slidably and supportedly engaging said inlet pipe adjacent the upper end thereof and above its discharge openings.

3. In an oil filter, the combination of a cylindrical container open at the top and provided with a removable cover and having a closed bottom constituting a sump and provided with a drain opening, a centrally disposed inlet pipe mounted on the bottom of the container to extend upwardly therefrom centrally of the container and internally threaded at its upper end, a removable filter cartridge comprising outer and inner foraminate walls and top and bottom walls connecting said outer and inner cartridge walls in spaced relation and coacting therewith to define a chamber containing filtering material, the inner cartridge wall spacedly surrounding said inlet pipe, the outer cartridge wall being spaced from the container wall, the inlet pipe having discharge openings communicating with the space within the inner cartridge wall, an imperforate sump wall below the said cartridge bottom wall and connected thereto to provide a sump chamber opening to the space between said inner cartridge wall and said inlet pipe but otherwise closed, said sump wall having an opening for said inlet pipe provided with a gasket slidably and supportedly engaging said inlet pipe, said inner cartridge wall being provided with a gasket slidably and supportedly engaging said inlet pipe adjacent the upper end thereof and above its discharge openings, a cover attaching bolt disposed through said cover and threaded into said inlet pipe and having a longitudinal pressure relief passage therein opening to said inlet pipe and within the container above the cartridge, said relief passage being provided with a pressure relief valve, and a cartridge positioning member carried by said bolt.

4. In an oil filter, the combination of a container, an oil conduit within and carried by the container, a removable filter cartridge comprising outer and inner foraminate walls and top and bottom walls connecting said outer and inner cartridge walls in spaced relation and coacting therewith to define a chamber containing filtering material, the inner cartridge wall spacedly surrounding said conduit, the outer cartridge wall being spaced from the container wall, the conduit having discharge openings to the space between the conduit and the inner cartridge wall, and an imperforate sump wall below the said cartridge bottom wall and connected thereto to be removed as a unit with the cartridge from the container and to provide a sump chamber opening to the space between said inner cartridge wall and said conduit but otherwise closed, said sump wall having an opening for said conduit provided with a gasket slidably and supportedly engaging said conduit, the sliding engagement of the gasket with the conduit facilitating removal of the sump wall as a unit with the cartridge from the container, said inner cartridge wall being provided with a gasket slidably and supportedly engaging said conduit adjacent the upper end thereof and above its discharge openings.

5. In an oil filter, the combination with a container, of a filter cartridge removably supported within said container and comprising inner and outer foraminate side walls and top and bottom walls connecting the inner and outer side walls in relatively fixed relation and coacting therewith to provide a filtering material chamber, said chamber containing fibrous filtering material of substantially uniform density, the inner and outer walls being fixed relative to each other under use conditions, the outer wall being spaced from the wall of the container to permit the flow of filtered material through the inner wall and the filtering material into the space around the cartridge, said inner wall constituting an oil inlet passage, said cartridge having an imperforate sump below and integral therewith to be removed as a unit with the cartridge from the container and opening to the said inlet passage, said container having an oil inlet connection communicating with the lower end of said inlet passage and an oil discharge opening thereto at the outside of the cartridge.

6. A removable filter cartridge for use in a container having an upstanding inlet pipe provided with a discharge opening, the filter cartridge comprising spaced inner and outer foraminate walls, a closed bottom wall and a foraminate top wall coacting with said outer and inner walls to define a chamber, which chamber is filled with fibrous filtering material, the inner cartridge wall being adapted to spacedly surround the inlet pipe of the container with the outer cartridge wall spaced from the container and with the discharge opening of the inlet pipe discharging to the space within the inner cartridge wall, and an imperforate sump wall peripherally connected to the bottom of the outer cartridge wall below the said cartridge bottom wall and constituting a sump chamber opening to the bottom of the space within the inner cartridge wall, said sump wall having an inlet pipe receiving opening therein provided with a gasket adapted for slidable and supported engagement with the inlet pipe, said inner cartridge wall being provided with a gasket adapted for slidable and supported engagement with the inlet pipe about its discharge opening.

7. A removable filter cartridge for use in a container having an upstanding inlet pipe, the filter cartridge comprising spaced outer and inner foraminate walls and top and bottom walls coacting with said outer and inner walls to define a chamber for filtering material, said chamber containing fibrous filtering material, the inner cartridge wall being adapted to spacedly surround the inlet pipe of the container with the outer cartridge wall spaced from the container wall and with the inlet pipe discharging to the space within the inner cartridge wall, and a sump fixedly connected to the lower end of the cartridge to be removed as a unit with the cartridge from the container and opening to the bottom of the space within the inner cartridge wall, the sump being otherwise closed, the sump wall having an inlet pipe receiving opening therein provided with a gasket adapted for slidable and supported engagement with the inlet pipe, the sliding engagement of the gasket with the inlet pipe facilitating removal of the sump as a unit with the cartridge from the container, said inner cartridge wall being provided with a gasket adapted for slidable and supported engagement with the inlet pipe about its discharge opening.

8. A filter cartridge for use in a container having a cylindrical side wall open at the top and provided with a removable cover, said cartridge comprising cylindrical outer and inner foraminate walls and top and bottom walls connecting said outer and inner walls in spaced relation and coacting therewith to provide a chamber for fibrous filtering material, and an imperforate sump wall coacting with the bottom wall of the chamber to provide a sump, the sump being connected to said cartridge to be removed as a unit therewith from said container, said sump wall and said inner cartridge wall being provided with vertically spaced packing members adapted for sliding sealing engagement with a conduit for the medium to be filtered.

9. A removable filter cartridge for use in a container having inlet and outlet connections, said filter comprising outer and inner walls and top and bottom walls connecting said outer and inner cartridge walls in fixed spaced relation to each other and coacting therewith to define a chamber containing filtering material, the bottom wall being imperforate, certain of the said walls including the inner wall being foraminate, and an imperforate sump wall below the said cartridge bottom wall and coacting therewith to provide a sump chamber opening to the space within said inner cartridge wall, said sump wall having an opening adapted to receive a conduit disposed centrally of the filter container, the sump wall extending from the opening therein to the outer of the spaced walls of the cartridge.

10. A filter cartridge for use in a container having an upstanding oil conduit pipe, said cartridge comprising cylindrical outer and inner walls and top and bottom walls connecting said outer and inner walls in spaced concentric relation and coacting therewith to provide a chamber for fibrous filtering material, certain of the walls including the inner wall being foraminate, and an imperforate sump wall connected to said filtering material chamber walls to be removed as a unit therewith from a container and coacting with the bottom wall thereof to provide a sump, said sump wall and said inner cartridge wall being provided with vertically spaced packing members adapted for sliding sealing engagement with an inlet pipe.

11. A filter cartridge for use in a container having an upstanding oil conduit pipe, said cartridge comprising cylindrical outer and inner walls and top and bottom walls connecting said outer and inner walls in spaced concentric relation and coacting therewith to provide a chamber for fibrous filtering material, certain of the walls including the inner wall being foraminate, and an imperforate sump wall connected to said filtering material chamber walls to be removed as a unit therewith from a container and, to provide a sump opening to the bottom of the space within said cartridge inner wall.

12. A removable filter cartridge for use in a container having inlet and outlet connections, said filter comprising outer and inner walls and top and bottom walls connecting said outer and inner cartridge walls in spaced fixed relation to each other and coacting therewith to define a chamber containing filtering material, certain of the walls including the inner wall being foraminate, the inner wall having a space therein, and a sump connected to the filtering chamber walls to form a unit therewith for removal as a unit from a container and opening to the lower end of the space within said inner cartridge wall.

References Cited in the file of this patent

UNITED STATES PATENTS

| | | |
|---|---|---|
| 1,723,374 | Roehr | Aug. 6, 1929 |
| 2,087,385 | Maujoks | July 20, 1937 |
| 2,201,418 | Williams et al. | May 21, 1940 |
| 2,211,305 | Werder | Aug. 13, 1940 |
| 2,212,647 | Nugent | Aug. 27, 1940 |
| 2,294,262 | Wilkinson | Aug. 25, 1942 |
| 2,533,192 | Kennedy | Dec. 5, 1950 |
| 2,548,440 | Morris | Apr. 10, 1951 |